No. 676,614. Patented June 18, 1901.
D. H. ANDREWS.
AUTOMATIC BRAKE.
(Application filed Mar. 27, 1901.)
(No Model.)
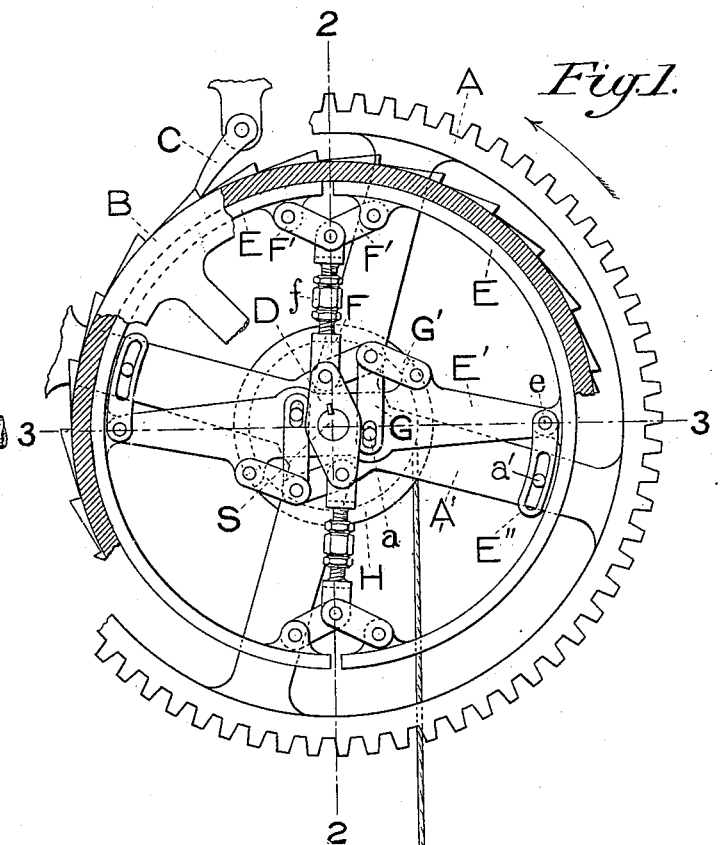
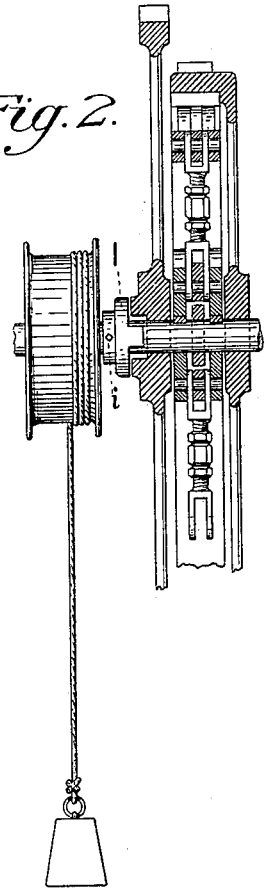
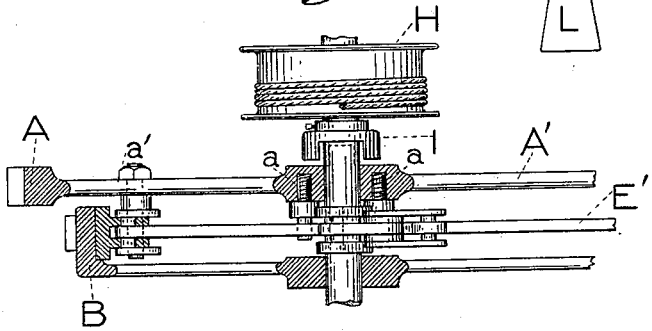
WITNESSES:
E. E. Walker
I. A. Fulton
INVENTOR:
David H. Andrews,
BY Thomas J. Johnston,
ATTORNEY.

UNITED STATES PATENT OFFICE.

DAVID H. ANDREWS, OF NEWTON, MASSACHUSETTS.

AUTOMATIC BRAKE.

SPECIFICATION forming part of Letters Patent No. 676,614, dated June 18, 1901.

Application filed March 27, 1901. Serial No. 53,050. (No model.)

*To all whom it may concern:*

Be it known that I, DAVID H. ANDREWS, of Newton, in the county of Middlesex and Commonwealth of Massachusetts, have made certain new and useful Improvements in Automatic Brakes, of which the following is a specification.

My present invention relates to automatic brakes of the general class in which a ratchet-wheel and pawl are provided, the wheel capable of motion in one direction and being held against rotation in the other by a pawl, while friction devices are interposed between the shaft and the wheel, the friction devices being actuated by the load, so that the latter is held in suspension automatically whenever the power ceases and is released in one way or another by a reversal of the power. Several different forms of automatic brakes of this class have been devised. In some of these a thread upon the shaft or a helical inclined cam carried by it furnishes an end pressure against a pulley, locking the driving-gear to the pulley in one direction, while actuating the gear in the other direction rotates the thread, the rotation being followed up by the drum or pulley under the stress of the load. These have been found objectionable, because the thread is liable to become distorted from wear or to be stripped under heavy duty, causing the brake to be unreliable in action. Another construction has applied the friction devices by means of an external band-brake. These also have been found objectionable, because they required manual actuation to release the friction. Others have used internal shoes, such as I prefer, and have applied them by sliding collars on the shaft; but these have been better adapted for friction-clutches than for a brake. My present invention aims to improve upon these constructions, and especially upon the connecting devices between the ratchet and the inner rotating part of the brake, and has for its object to furnish a strong and very effective connection between the shaft and the ratchet to be used while hoisting and at the same time one which requires but little power to release, so that the load may be easily lowered and yet be secure against running away. To attain these ends, I provide within the ratchet-wheel friction-plates, preferably in the form of a sliding ring or shoe which covers substantially its entire circumference, with a toggle for spreading apart the shoe or ring at desired points, the toggle operated by a crank affixed to the shaft to which the hoisting-drum is attached and being released by another toggle connected, as hereinafter described, to the gear operating the device. It is of course apparent that the brake may be applied to a power-actuated apparatus or to an ordinary hand-operated winch or windlass, and from the fuller description contained in this specification it will be apparent that the power employed will at all times be in proportion to the amount of the load, both in raising the latter and in lowering it. At the same time the arrangement of the mechanism is such as to get a very powerful leverage, so that the parts move readily. Inasmuch as the movement to release the frictional engagement need be with my device but slight, this is easily arranged, and yet the release is effected with certainty under all conditions of working.

The accompanying drawings show an embodiment of my invention, in which—

Figure 1 is a side elevation, partly in section and partly broken away, of a brake constructed according to my invention. Fig. 2 is an end elevation, partly in section, upon the line 2 2 of Fig. 1. Fig. 3 is a plan, partly in section, upon the line 3 3 of Fig. 1.

A is the gear by which the hoisting apparatus is operated. In the particular device here shown it is intended for operation by an electric motor, (not illustrated,) the pinion upon which would run the gear A. It is manifest that any form of power may be used, and so it is unnecessary to illustrate or describe this feature.

A' is a spider-arm of the gear A. This spider-arm carries pins $a\ a'$, to be more fully described presently.

B is the ratchet-wheel, which coöperates with the pawl C, the latter being fixed to any convenient part of the stationary frame (not shown) of the apparatus. Any desired form of this device may be used, many being well known in the art. Both the gear A and the ratchet B are loose upon the shaft S, which carries the whole device.

Against the inner surface of the ratchet B are applied the shoes E E. These are carried upon the arm E', which also runs loose upon the shaft. At the ends of this arm are pins $e$, which carry slotted links E². In the slots in these links move the pins $a'$, carried by the arm A' of the gear, so that the shoes carried upon the arm E' and the gear have relative motion, limited by the length of the slot in the link E².

D is a double crank keyed to the shaft S, as is also the drum H, which raises and lowers the load L. In the ends of this crank are pivoted rods F, provided with a threaded adjustment $f$. To the ends of the rod are attached the links F' F', the other ends of the links being pivoted in lugs in the shoes E E and the links themselves forming a toggle which when straightened by the pressure of the rod F tends to expand the shoes against the inner surface of the ratchet B. The rod F and the crank D form a second toggle. Links G' G' are pivoted, respectively, to the end of the crank D, one on the same center with the rod F and the other to a lug on the arm E', which carries the shoes E. Another link G is attached by the pin $a$ to the arm A' and operates the toggle formed by the links G' G', its other end being secured to the pin at the center of the toggle.

I is a collar fixed in any suitable way to the shaft, as by the set-screw $i$. This has lugs upon it and fits with a certain amount of play in the hub of the gear A. It may act as a substitute for or addition to the links E² and pins $a'$. In practice I may use either or both. In large apparatus designed for heavy duty the collar might, if desired, be of increased size; but under these circumstances the connection near the rim or outer circumference of the gear will in general be better because of the diminished leverage upon it. The play of the parts may be so adjusted as either to make the pins and links and the collar I cooperate under load or so that one will only come into use in case of breakage of the other, thus acting as a safety device.

The operation of the device is as follows: When the gear A is revolved in the direction of the arrow, the pin $a'$ moves in the slot in the link E² until it abuts against the end of it, thus carrying around with the gear the arm E' and the shoes E E. When the stress of the load comes upon the drum H, it tends to rotate the crank D against the motion of the gear A, thus straightening the toggle formed by the crank and the arm F, thrusting upon and tending to straighten the toggle F' F' and forcing the shoes E E against the ratchet, carrying the latter around, the whole structure thus becoming rigidly connected by the friction of the shoes upon the inner surface of the ratchet. When the gear A is brought to a standstill, the ratchet is prevented from moving back by the pawl C, and the strain of the load upon the crank D keeps the shoes in engagement with the ratchet, thus holding the load wherever the gear may stop. When the power is applied to the gear A in the reverse direction, the load will be lowered, the pin $a'$ moves downward in the slot in the link E², the arm A' carrying down the pin $a$, pulling on the link G, straightening the toggle composed of the links G G', forcing open the toggle D F and releasing the pressure of the shoes E until the device (except the ratchet B) runs backward. Of course if the gear A is stopped at any time the strain of the load will immediately set up the toggles and press upon the shoes until they engage with the ratchet. It will be observed that the pins $a$, which are carried in the arm A', pass through the arm E', and the latter arm is therefore slotted, so that the pins have a certain amount of play. These pins being near the center of motion and the power being applied at the circumference of the gear, there is a powerful leverage applied to straighten the toggle G' G' when the link G is pulled down, and the leverage of the toggle itself being also very great only a small amount of power is needed to lower the load.

The adjustment F is of any convenient form (I have illustrated it as a turnbuckle; but any other may be substituted) by which it is possible to compensate for wear of the shoes, which, however, is but small, owing to the large surface which engages with the ratchet B. They are also made of antifriction metal, the ratchet being made of cast-steel, and the whole device may be freely lubricated without impairing its action. By differently proportioning the various links the action may be modified or adjusted in any desired way to accommodate it to different loads which it is desired to carry. By shortening the links G', for example, the power required to open the toggle D F will be greatly diminished. Similarly by shortening the links F' the power required to cause the clutch action to carry will be diminished. Of course increasing the leverage decreases the movement of the parts, so that the increase must not be great enough to render the action of the brake uncertain.

The main feature of the invention consists in the combination of the different toggles to effect the purposes of the invention. Different ways of application will readily be understood by the engineer; but the way which I have illustrated I have found in practice to be efficacious and desirable—that is, employing the toggle composed of the crank and arm operated by the counter torque of the loaded shaft as a means of setting up or expanding the split ring (which constitutes the friction plate or shoe) when the load is to be raised or held stationary and the opening of this toggle by the releasing-toggle (composed of the links G') by the pull of the link G when the power is applied to lower the load.

It is manifest that changes may be made in the construction of the device which will not depart from the principles here described and explained, and all such changes I aim to cover by the claims.

I claim—

1. In an automatic brake, the combination, with the shaft to be controlled, of a ratchet loose upon the shaft, a fixed pawl, a crank rigidly connected with the shaft, friction-plates coöperating with the inner side of the ratchet, and a toggle of which a rod connected to the friction-plates is one member, and the crank the other; so arranged, substantially as set forth, that the counter torque of the load upon the shaft tends to straighten the toggle and apply the brake.

2. In an automatic brake, the combination of the shaft to be controlled, a ratchet and pawl, a crank affixed to the shaft, a rod pivoted to the crank and forming therewith a toggle, a split ring upon the inside of the ratchet, a toggle for expanding the split ring, the rod connected with the crank being connected at its other end to the expanding-toggle; means for rotating the split ring in either direction, and means for opening the toggle composed of the crank and rod, when the ring is rotating in the direction of the load-pull; whereby the counter torque of the load tends to expand the ring by straightening the toggle, and the reversal of the power opens the toggles to contract the ring and permit reverse motion of the shaft relative to the ratchet.

3. In an automatic brake, the combination, with the pawl and the ratchet and split ring, of a toggle for expanding the ring, a second toggle composed of a rod affixed to the first and a crank rigid with the shaft to be controlled, means for rotating the split ring in either direction, and a third toggle connecting the first to such means; whereby the counter torque of the load expands the ring so that the ratchet is carried with it, and reversal of the power contracts the ring so that it may move independently of the ratchet.

4. In an automatic brake for a hoisting-machine, the combination of the hoisting-drum fixed to the shaft, the ratchet loose upon the shaft, and its fixed pawl; the crank fixed to the shaft, the rod forming with the crank a toggle, a split ring engaging with the ratchet when the toggle is straightened, the gear carrying the split ring when driven, and a releasing-toggle connecting the ring to the crank, operating when the gear is rotated in lowering the load to open the toggle composed of the crank and rod and so contract the ring that it may run free of the ratchet; whereby the ring is automatically engaged with the ratchet by the counter torque of the load when the power ceases or is applied to raise the load, and is released from such engagement when the power is reversed.

5. In an automatic brake, the combination of the crank D, the rod F, the split ring and the toggle F' for expanding the ring, with the ratchet and pawl, as described and for the purposes set forth.

6. In an automatic brake, the combination of the crank and rod constituting a toggle, a ratchet and pawl, a split ring opened and closed by the movement of the toggle, and the toggle G' for opening the toggle composed of the crank and rod.

7. The combination with the ratchet and pawl, of the shaft and the arm E', the split ring E, the toggle F' for expanding it, the toggle composed of the crank D and rod F, the crank being affixed to the shaft, the releasing-toggle G', the gear A, having the arm A' carrying the pins $a'$ $a$, and the links E² connected to the arm E' carrying the ring E.

In testimony whereof I have signed my name to this specification in the presence of two witnesses.

DAVID H. ANDREWS.

Witnesses:
PATRICK H. HEALY,
AMORY ELIOT.